(No Model.) 2 Sheets—Sheet 1.
W. HILL.
HARROW.
No. 353,944. Patented Dec. 7, 1886.
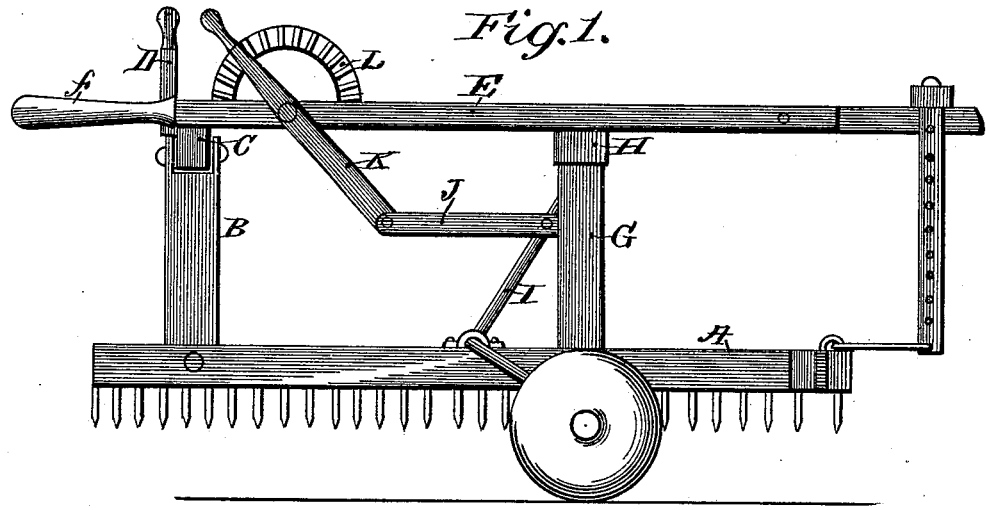
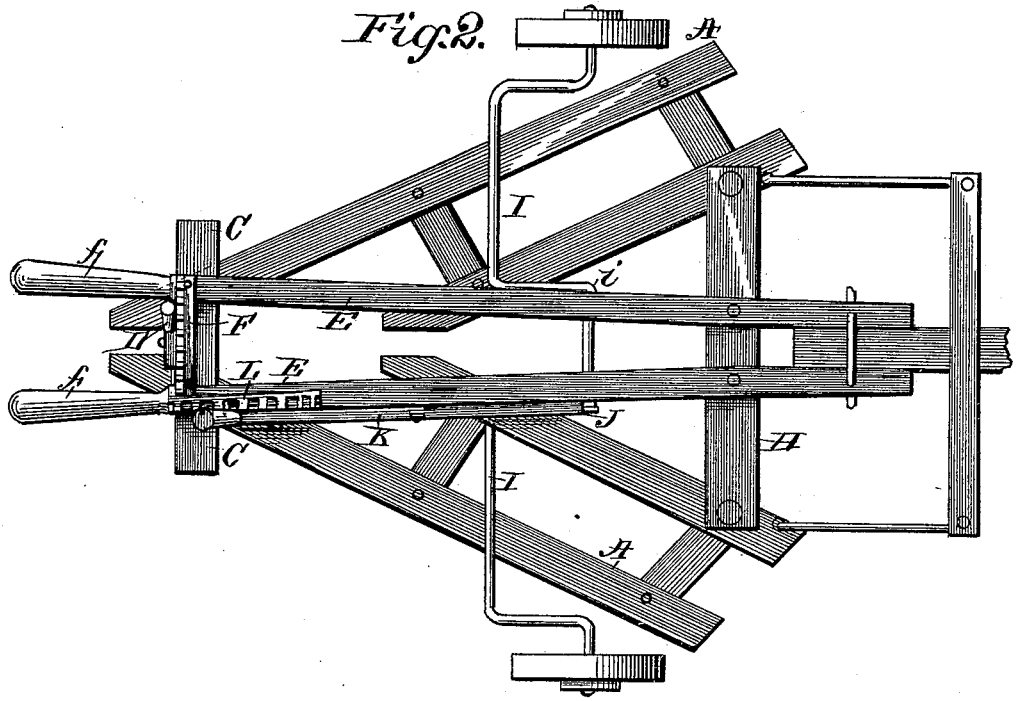
WITNESSES
William Hill,
INVENTOR
J. B. Lawyer,
Attorney (No Model.) 2 Sheets—Sheet 2.
W. HILL.
HARROW.
No. 353,944. Patented Dec. 7, 1886.
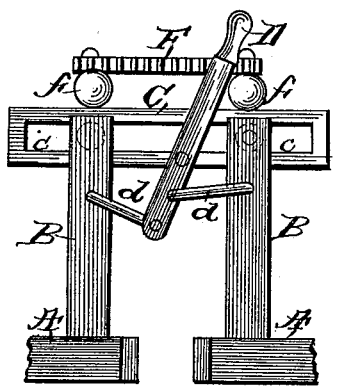
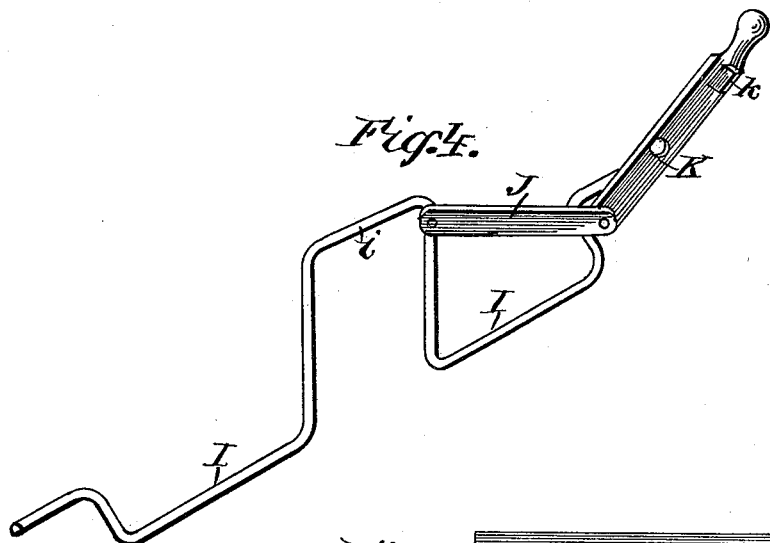
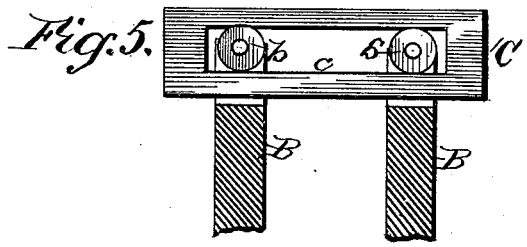
William Hill,
INVENTOR
J. B. Lawyer
Attorney
WITNESSES
Fred Hallett
F. C. Lawyer

UNITED STATES PATENT OFFICE.

WILLIAM HILL, OF ALICEVILLE, KANSAS.

HARROW.

SPECIFICATION forming part of Letters Patent No. 353,944, dated December 7, 1886.

Application filed July 13, 1886. Serial No. 207,892. (No model.)

*To all whom it may concern:*

Be it known that I, WILLIAM HILL, a citizen of the United States, residing at Aliceville, in the county of Coffey and State of Kansas, have invented certain new and useful Improvements in Harrows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has for its object to provide a novel construction in wheel-harrows; and it consists in the mechanism made use of for raising and lowering the same at any desired depth from or entirely out of the ground, and also for adjusting the harrows to and from each other, as will be hereinafter fully described.

In the accompanying drawings, in which corresponding parts are designated by similar letters, Figure 1 represents a side elevation of my improved harrow. Fig. 2 is a top plan view. Fig. 3 is an end view. Fig. 4 represents a detail view of the crank-shaft and device for operating the same, and Fig. 5 is a detail view of the mechanism used for adjusting the harrows to and from each other.

Referring to the drawings, A A represent the harrows, constructed, by preference, as shown in the drawings, for receiving or allowing the stalks of the corn or cotton free passage or access between them, and having rigidly secured thereto, at the rear portion or pointed end of the harrows, two uprights, B B, of any desired height, and provided with rollers $b\ b$, journaled within the upper end of the same, which are adapted to receive and travel in the slot $c$ of the cross-frame C.

At the center of the slotted cross-frame is pivoted a lever, D, provided with connecting links or rods $d\ d$, connected above and below the pivotal point of the said lever, the same being extended over and connected to the uprights B B, for adjusting the harrows at any desired space from each other by the operation of the lever D, as fully shown in Fig. 5. To the lever D is rigidly secured the pawl $d'$, that meshes or receives the ratchet-brace F, and extends across the supporting-braces E E, thereby firmly securing it in any desired position.

At the front end of the machine, and upon the upper side of the harrows A A, are loosely pivoted the uprights G G, which may be placed at any desired position upon the same, as shown in the figures, and forming a hinged joint at that point to allow the opposite end of the harrows free movement, to be governed by the lever D, and upon the said uprights G G is rigidly secured the cross frame or brace H, upon which the horizontal braces E E, traveling the entire length of the machine, are secured, and also extended over the slotted cross-frame C and rigidly secured thereto, terminating in handles $f\ f$, for guiding or governing the direction of the machine.

Upon the harrows A A is journaled an axle, I, terminating at its center in a crank-shaft, as shown at $i$, having an arm, J, secured thereto, which is pivoted to the lower end of the lever K, which has its bearing attached to one side of the brace E, the same being provided in the like manner with a pawl, $k$, for receiving or meshing with the semicircular ratchet L, also secured to the horizontal brace E, and arranged in close proximity to the lever $d$, operating the harrows, whereby the operator can operate the entire machine from the rear portion thereof.

The crank-shaft I, after running horizontally in the bearing attached to the harrows, extends some distance beyond the sides of the same, and bent to receive the wheels, which bend of the said axle also allows the harrows to be thrown entirely out of the ground, if desired, or any gradual depth in the same, by the lever K, at the will of the operator.

In carrying out my invention it will be observed that the entire operation is attained at the rear portion of the machine, behind which the operator has ready access to the lever mechanisms operating the machine. To adjust the harrow to any width desired, the lever D is thrown to one side, thereby at the same time throwing the links $d\ d$ in an outward or closed position, and being attached to the uprights connecting the harrows, the same are spaced as desired.

The spacing is a very essential feature, as will be readily observed, for the purpose of harrowing on each side of rows of cotton or other plants and allowing them to pass freely between the harrows, whereby the same are undisturbed.

Having thus described my invention, what I claim, and desire to secure by Letters Patent, is—

1. The combination of the harrows A A, rigidly secured to the uprights B B, carrying rollers $b\ b$, running in the slotted cross-frame C, the lever D, pivoted thereto and provided with connecting links or arms $d\ d$, the uprights G G, loosely pivoted to said harrows, and provided with the stationary cross-frame H, and the crank-axle I, carrying the wheels, as and for the purpose described.

2. The combination of the harrows A A, rigidly secured to the uprights B B, carrying rollers $b\ b$, running in the slotted cross-frame C, the lever D, provided with the pawl $d'$, the connecting links or arms $d\ d$, the uprights G G, loosely pivoted to said harrows, and provided with a stationary cross-frame, H, the horizontal braces E E, secured thereto and terminating in handle $f\ f$, the ratchet-brace F, and crank-axle I, as and for the purpose described.

3. The combination of the harrows A A, provided with the crank-shaft I, the arm J, secured thereto and hinged to the lever K, attached to the brace E, the semicircular ratchet L, the uprights B B, carrying rollers $b\ b$, running in the slotted cross-frame C, the lever D, and connecting links or arms $d\ d$, for operating the said harrows, as and for the purpose described.

In testimony whereof I affix my signature in presence of two witnesses.

WILLIAM HILL.

Witnesses:
JOHN D. FRAZIER,
S. W. HARMAN.